United States Patent
Niu et al.

(10) Patent No.: US 7,657,244 B2
(45) Date of Patent: Feb. 2, 2010

(54) METHODS OF ANTENNA SELECTION FOR DOWNLINK MIMO-OFDM TRANSMISSION OVER SPATIAL CORRELATED CHANNELS

(75) Inventors: Huaning Niu, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 509 days.

(21) Appl. No.: 11/261,726

(22) Filed: Oct. 27, 2005

(65) Prior Publication Data
US 2007/0099584 A1    May 3, 2007

(51) Int. Cl.
H04B 1/06 (2006.01)
H04B 7/02 (2006.01)
H04L 5/04 (2006.01)

(52) U.S. Cl. ............ 455/277.1; 455/277.2; 455/101; 370/204; 370/343; 375/299; 375/347

(58) Field of Classification Search ............... 455/101, 455/277.1, 277.2, 562.1; 370/204, 336, 343; 375/299, 347
See application file for complete search history.

(56) References Cited

U.S. PATENT DOCUMENTS

| | | | | |
|---|---|---|---|---|
| 6,801,790 B2 * | 10/2004 | Rudrapatna | ............... | 455/562.1 |
| 6,850,741 B2 * | 2/2005 | Lei et al. | ..................... | 455/101 |
| 6,862,271 B2 * | 3/2005 | Medvedev et al. | .......... | 370/329 |
| 7,006,810 B1 * | 2/2006 | Winters et al. | ............ | 455/277.1 |
| 7,382,840 B2 * | 6/2008 | Molisch et al. | ............. | 375/347 |
| 2003/0162519 A1 * | 8/2003 | Smith et al. | ............... | 455/277.1 |
| 2004/0146018 A1 * | 7/2004 | Walton et al. | ................ | 370/329 |
| 2005/0090205 A1 * | 4/2005 | Catreux-Erceg et al. | ...... | 455/78 |
| 2005/0190849 A1 * | 9/2005 | McNamara | .................. | 375/267 |
| 2005/0237971 A1 * | 10/2005 | Skraparlis | .................... | 370/329 |
| 2006/0067417 A1 * | 3/2006 | Park et al. | .................... | 375/260 |
| 2006/0083195 A1 * | 4/2006 | Forenza et al. | .............. | 370/328 |
| 2006/0140297 A1 * | 6/2006 | Maltsev et al. | .............. | 375/260 |
| 2007/0087701 A1 * | 4/2007 | Kobayashi et al. | ........... | 455/101 |
| 2008/0056217 A1 * | 3/2008 | Hara et al. | ................... | 370/342 |
| 2009/0129501 A1 * | 5/2009 | Mehta et al. | ................. | 375/299 |

FOREIGN PATENT DOCUMENTS

JP   2003-258709   *   9/2003

OTHER PUBLICATIONS

Tetsushi Abe et al, "A Hybrid MIMO system using spatial Correlation", IEEE vol. 3, Oct 27, 2002, pp. 1346-1350.*

(Continued)

*Primary Examiner*—Duc M Nguyen
(74) *Attorney, Agent, or Firm*—Kenneth L. Sherman, Esq.; Michael Zarrabian, Esq.; Myers Andras Sherman LLP (57) ABSTRACT

An antenna selection technique (transmitter/receiver antenna selection) that reduces the cost of the MIMO system while maintaining high performance. A combined selection algorithm for MIMO-OFDM is provided which offers the best tradeoff between spatial correlation and instantaneous SNR. In one case, antenna selection is based on instant channel information. In another case antenna is based on statistical channel state information. In another case, antenna selection is based on a hybrid of instant channel state information and statistical channel state information.

20 Claims, 7 Drawing Sheets

OTHER PUBLICATIONS

Andreas F. Molisch, "MIMO systems with antenna selection—an overview", Radio and Wireless Conference, Aug. 10, 2003, pp. 167-170.*

D. A. Gore et al, "Transmit Selection in Spatial Multiplexing Systems", IEEE Communications letters, vol. 6, No. 11, Nov. 2002, pp. 491-493.*

A.F. Molisch et al, "MIMO system with antenna selection—an overview", Mitsubishi Electric Research Lab, TR-2004-14, Mar. 2004.*

D.A. Gore, R. W. Heath and A.J. Paulraj, *Transmit selection in spatial multiplexing systems*, IEEE Comm. Letters, Nov. 2002, pp. 491-493, vol. 6, No. 11.

R.W. Heath, S. Sandhu and A. Paulraj, *Antenna selection for spatial multiplexing systems with linear receivers*, IEEE Comm. Letters, Apr. 2001, pp. 142-144, vol. 5, No. 4.

R.S. Blum and J.H. Winters, *On optimum MIMO with antenna selection*, IEEE Comm. Letters, Aug. 2002, pp. 322-324, vol. 6, No. 8.

Vinco Erceg et al., *IEEE P802.11 Wireless LANs, TGn Channel Models*, doc.: IEEE 802.11-03/940r1, Nov. 2003, pp. 1-45.

\* cited by examiner

METHODS OF ANTENNA SELECTION FOR DOWNLINK MIMO-OFDM TRANSMISSION OVER SPATIAL CORRELATED CHANNELS

FIELD OF THE INVENTION

The present invention relates generally to data communication, and more particularly, to data communication in multi-channel communication system such as multiple-input multiple-output (MIMO) systems.

BACKGROUND OF THE INVENTION

Wireless systems employing multiple antennas at the transmitter and at the receiver (MIMO) increase the capacity of the wireless channel. One major concern in the implementation of these systems is the high cost owing to the price of the RF chains (low noise amplifiers, analog-to-digital converters, etc.) attached to each antenna. On the other hand, the additional antenna elements are usually inexpensive, and the additional digital signal processing becomes ever cheaper. A low cost, low complexity solution to this problem is to choose a subset of antennas M out of N antenna signals (either at one or both link ends), down-converted, and processed. This reduces the number of required RF chains from N to M, and, thus, leads to significant savings. The savings come at the price of a (usually small) performance loss compared to the full-complexity system.

Receiver antenna selection and combining has been well studied in literature on RAKE receivers. On the other hand, transmitter antenna selection is particular interest to down link transmission where the access point (AP) usually have larger space and can install large number of antennas. Transmitter antenna selection over flat fading channel has been suggested in conventional systems. For example, D. A. Gore, R. W. Heath and A. J. Paulraj, "Transmit selection in spatial multiplexing systems", IEEE Comm. Letters, Vol. 6, No. 11, November 2002, pp. 491-493, provide two selection algorithms based on the statistical information of the channel correlation. The first algorithm maximizes the average throughput, and the second one maximizes average error probability. Both algorithms provide the same selection results.

Further, R. W. Heath, S. Sandhu and A. Paulraj, "Antenna selection for spatial multiplexing systems with linear receivers," IEEE Comm. Letters, Vol. 5, No. 4, April 2001, pp. 142-144, analyze antenna selection performance for spatial multiplexing systems with linear receivers using the instantaneous channel knowledge. Three selection criteria, namely maximization of post-processing SNR, maximization of minimum singular value and maximization of capacity are compared.

In addition, R. S. Blum and J. H. Winters, "On optimum MIMO with antenna selection," IEEE Comm. Letters, Vol. 6, No. 8, August 2002, analyze the optimality of MIMO with antenna selection. However, all of the above approaches are focused on the flat fading channels.

BRIEF SUMMARY OF THE INVENTION

In one embodiment, the present invention provides an antenna selection technique (transmitter/receiver antenna selection) to reduce the cost of the MIMO system while maintaining high performance. In the case of downlink transmission from access point (AP) to mobile station, where more antennas are installed at the AP, transmitter antenna selection can further reduce the detection complexity.

According to the present invention, the conventional antenna selection algorithms are extended from flat fading channel to frequency selective channel, i.e. for MIMO-OFDM systems. Further, a combined selection algorithm for MIMO-OFDM is provided which offers the best tradeoff between spatial correlation and instantaneous SNR.

As such, in one embodiment, the present invention provides antenna selection method based on instantaneous channel knowledge. In another embodiment the present invention provides antenna selection method based on statistical channel knowledge. Yet in another embodiment, the present invention provides antenna selection method based on a hybrid of instantaneous channel knowledge and statistical channel knowledge.

These and other features, aspects and advantages of the present invention will become understood with reference to the following description, appended claims and accompanying figures.

DETAILED DESCRIPTION OF THE INVENTION

Antenna diversity schemes improve the performance of radio frequency (RF) communication between two RF devices. Antenna diversity refers to the existence of two or more signal paths that fade independently. This happens when the wireless channel includes several paths that are sufficiently separated in space, time, frequency or polarization. In this case, the paths are combined into a total signal with high quality. Antenna selection, where the "best" of M out of N antennas are chosen, is a solution to reduce the system complexity while retaining the diversity degree.

In one embodiment, the present invention provides an antenna selection technique (transmitter/receiver antenna selection) to reduce the cost of the MIMO systems while maintaining high performance. In the case of downlink transmission from access point (AP) to mobile station, where more antennas are installed at the AP, transmitter antenna selection can further reduce the detection complexity. The conventional algorithms for flat fading channels cannot be applied to MIMO-OFDM systems because sub-carrier based antenna selection is not feasible using conventional algorithms (because of the IFFT operation in the transmitter, sub-carrier based selection results in transmitting OFDM symbols over all transmitter antennas).

According to the present invention, the conventional antenna selection algorithms are extended from flat fading channel to frequency selective channel, i.e. for MIMO-OFDM systems. For the antenna selection based on instantaneous channel information, according to an embodiment of the present invention the conventional selection algorithms are extended from flat fading channel to frequency selective channel by calculating the effective channel energy over all the available paths (ECK). For the antenna selection based on statistical channel information, the conventional selection algorithms are extended from flat fading channel to frequency selective channel by calculating the correlation matrix of dominate fading cluster (e.g., a set of paths which arrives approximately the same time with the highest energy) (SCK).

Further, a combined selection algorithm for MIMO-OFDM is provided which offers the best tradeoff between spatial correlation and instantaneous SNR.

As such, in one embodiment, the present invention provides antenna selection method based on instantaneous channel knowledge, described further below. In another embodiment the present invention provides antenna selection method based on statistical channel knowledge, described further below. Yet in another embodiment, the present invention provides antenna selection method based on a hybrid of instantaneous channel knowledge and statistical channel knowledge, described further below. As those skilled in the art will recognize, other antenna selection methods are possible according to the principles of the present invention.

Figure 1:
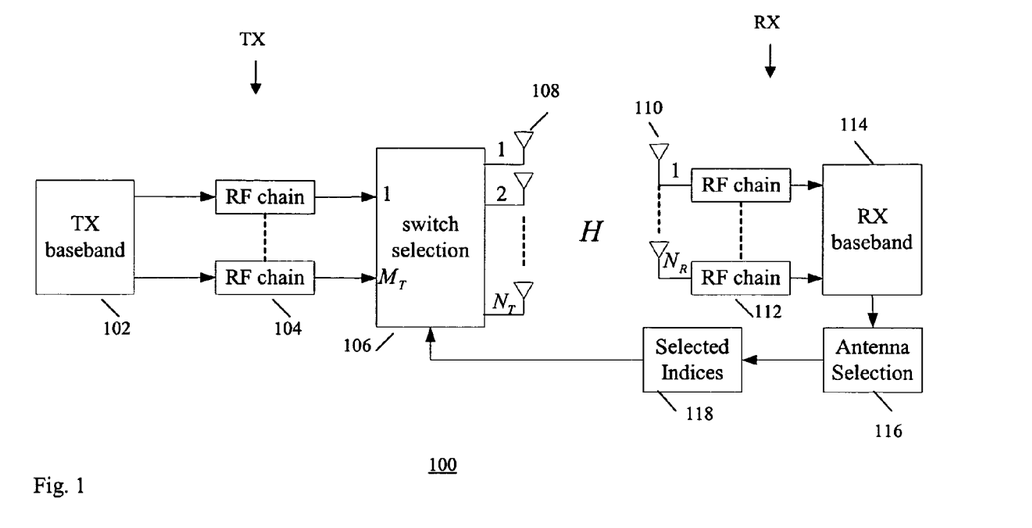
FIG. 1 shows a block diagram of an embodiment of a MIMO system with antenna selection.

FIG. 1 shows a block diagram of an embodiment of a MIMO wireless communication system comprising a transmitter TX and a receiver RX. The transmitter TX comprises a transmission baseband unit 102, $M_T$ number of RF chain units 104, a switch selection unit 106, and $N_T$ number of antennas 108. The receiver RX comprises $N_R$ number of antennas 110, $N_R$ number of RF chain units 112, a receiver baseband unit 114, an antenna selection unit 116 and a selected indices unit 118. The feedback information is sent from the selected indices unit 118 in the receiver to the switch selection unit 106 in the transmitter, through the same set of antennas as used for data communication. In the system of 100, antenna selection takes place at the transmitter TX.

Unit 102 provides base band signal processing, including coding, modulation etc. In units 104, RF chains convert the digital signal to RF analog signal to transmit. RF chains includes low-noise power amplifies, digital-to-analog converter, etc. Unit 106, antenna switch selection unit, selects the $M_T$ antennas out of the $N_T$ antennas based on the selection indices which are fedback from the receiver RX. In the receiver RX, units 112 RF chain convert the received RF analog signal to digital signal for further processing. RF chains include low-noise power amplifies, analog-to-digital converters, etc. In unit 114, RX baseband signal processing is performed including MIMO detection, diversity combing, demodulation and decoding, etc. In unit 116, an antenna selection process selects the "best" $M_T$ antennas out of the $N_T$ antennas based on different criterion to maximize the performance. The selection processes provided according to an embodiment of the present invention finds the $M_T$ antennas. In unit 118, the selected antenna index is fedback from the receiver RX to the transmitter TX using MAC control frame. The indices are usually just several bits.

In FIG. 1, the transmit antenna selection requires a feedback path from the receiver RX to the transmitter TX. This feedback rate is rather small. The present invention provides a different process to select the "best" antennas $M_T$, corresponding to the computation in the unit 116.

Antenna selection takes place at the transmitter TX, and the receiver RX determines the selection indices and informs the transmitter TX of which antenna should be selected.

Figure 2:
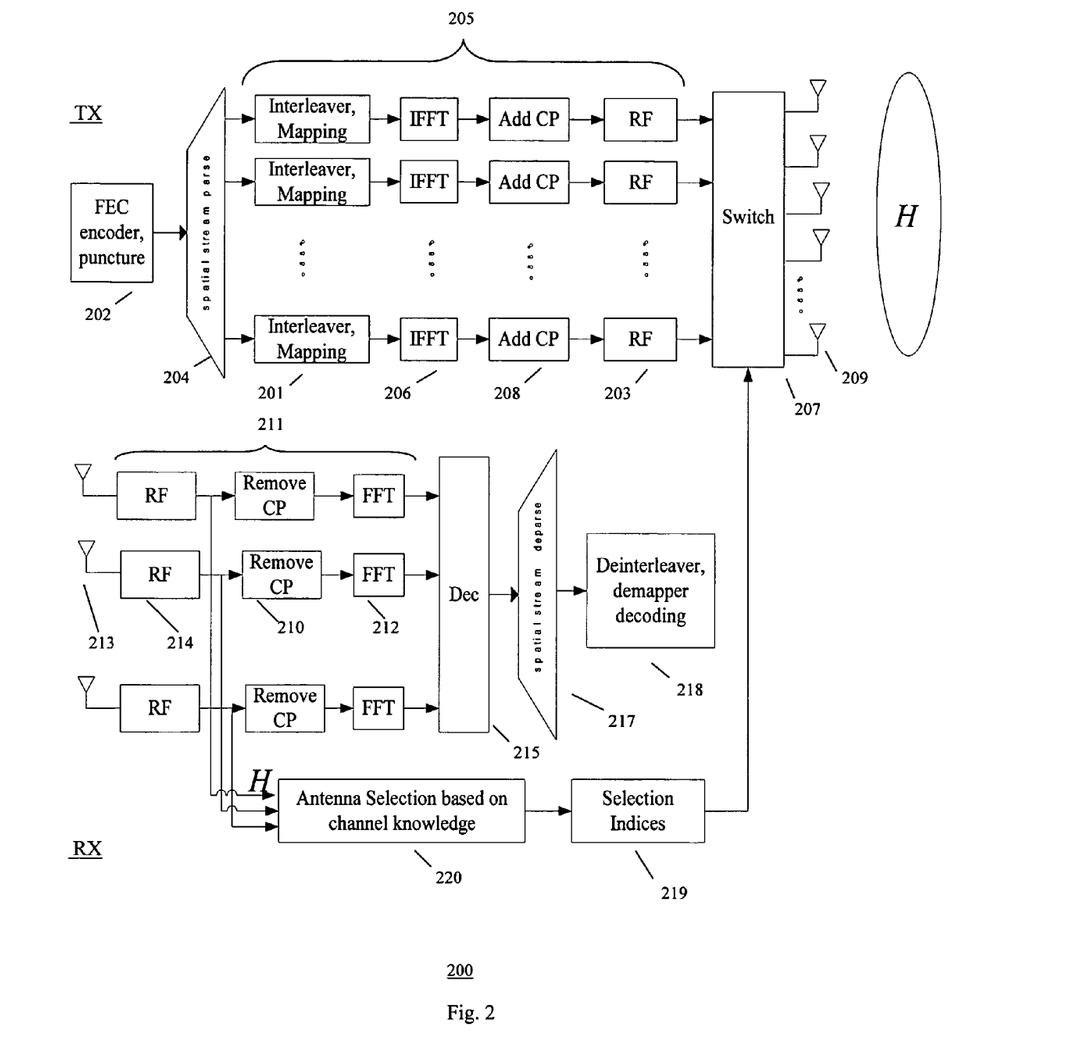
FIG. 2 shows a block diagram of an embodiment of a MIMO-OFDM transmission system.

FIG. 2 shows a block diagram of an embodiment of a MIMO-OFDM transmission system 200, comprising a transmitter TX and a receiver RX. The transmitter TX includes a FEC encoder/puncturer 202 which performs error correction coding on the data streams, a spatial stream parser 204 which parses the encoded bit streams to different data streams to transmit, multiple transmissions paths 205, a switch 207 that provides switching model which select the antenna subset to transmit, and multiple antennas 209 for data transmission over channel H. Each transmission path 205 includes an interleaver/mapper 201 which performs channel interleaving and QAM mapping (channel interleaving is to break the burst error pattern and improve the overall system performance, and QAM mapping performs standard constellation mapping), an IFFT unit 206, an Add CP unit 208 which insert cyclic prefix (CP) for inserting a guard interval to eliminate the intersymbol interference, and RF chain unit 203.

The receiver RX includes reception paths 211, wherein each reception path 211 includes an antenna 213; an RF Chain unit 214 that includes RF chain at the receiver side including down convention, A/D etc.; a Remove CP unit 210 that removes the guard interval for OFDM demodulation; and an FFT unit 212. The receiver RX further includes a Dec unit 215 that implements a MIMO detection model which detects the transmitted data, a spatial deparser 216 that provides spatial stream deparsing by mixing the transmitted data stream back to one encoded bit stream for Viterbi decoding, a deinterleaver/demapper/decoder 218, a selection indices unit 219 to feedback the desired antenna index to the transmitter TX, and an antenna selection unit 220 which performs the antenna selection algorithms based on the channel knowledge as described herein.

In FIG. 2, transmitter antenna selection is implemented by the election indices unit 219, the antenna selection unit 220 and switch 207 according to an embodiment of the present invention. The number of RF chains 214 at the receiver RX is the same as the number of receive antennas 213.

Antenna Selection Based on Instantaneous Channel Knowledge

A multiple-input-multiple-output (MIMO) communication system employs multiple transmit antennas in a transmitter and multiple receive antennas in a receiver for data transmission. A MIMO channel formed by the transmit and receive antennas may be decomposed into independent channels, wherein each channel is a spatial sub-channel (or a transmission channel) of the MIMO channel and corresponds to a dimension. The MIMO system can provide improved performance (e.g., increased transmission capacity) if the additional dimensionalities created by the multiple transmit and receive antennas are utilized.

The MIMO system has $N_T$ transmit antennas and $N_R$ receiving antennas. In a multi-path fading channel with a total of L paths, each path has a channel H(l) comprising a $N_R \times N_T$ matrix, wherein each element $h_{i,j}(l)$ of the matrix represents the channel response from jth transmit antenna to ith receiving antenna for the lth path, $l=1,\ldots,L$. Due to less scattering in physical channel, H(l) is usually a correlated matrix, which can be represented as:

$$[H(l)]=[R_{rx}(l)]^{1/2}[H_{iid}][R_{tx}(l)]^{1/2},$$

wherein $R_{tx}$ and $R_{rx}$ are the receive and transmit correlation matrices, respectively, and $H_{iid}$ is a matrix of independent zero mean, unit variance, complex Gaussian random variables, and $$[R_{tx}]=[\rho_{txij}]$$

$$[R_{rx}]=[\rho_{rxij}]$$

where $\rho_{txij}$ are the complex correlation coefficients between i-th and j-th transmitting antennas, and $\rho_{rxij}$ are the complex correlation coefficients between i-th and j-th receiving antennas. Following are examples of 4×4 MIMO channel transmit and receive correlation matrices:

$$R_{tx} = \begin{bmatrix} 1 & \rho^*_{tx12} & \rho^*_{tx13} & \rho^*_{tx14} \\ \rho_{tx21} & 1 & \rho^*_{tx23} & \rho^*_{tx24} \\ \rho_{tx31} & \rho_{tx32} & 1 & \rho^*_{tx34} \\ \rho_{tx41} & \rho_{tx42} & \rho_{tx43} & 1 \end{bmatrix}$$

$$R_{rx} = \begin{bmatrix} 1 & \rho^*_{rx12} & \rho^*_{rx13} & \rho^*_{rx14} \\ \rho_{rx21} & 1 & \rho^*_{rx23} & \rho^*_{rx24} \\ \rho_{rx31} & \rho_{rx32} & 1 & \rho^*_{rx34} \\ \rho_{rx41} & \rho_{rx42} & \rho_{rx43} & 1 \end{bmatrix}.$$

In one embodiment, the present invention provides antenna selection method based on instantaneous channel knowledge, wherein antennas are selected based on the highest instantaneous channel energy from each transmitter antenna. The instantaneous energy for each antenna can be determined as:

$$E_i = \sum_{j=1}^{Nr} \sum_{l=1}^{L} |h_{i,j}(l)|, \quad i=1,\cdots,N_T$$

where $N_R$ is the number of receiver antennas, L is the number of transmission paths, $h_{i,j}(l)$ is the channel response from ith transmitter antenna to jth receiver antenna. The value $E_i$ is calculated for each transmit antenna, then $E_i$ are sorted in a decreasing order, and the antenna indices with the $M_T$ largest $E_i$ is selected. Mathematically, this can be presented as $$\arg\max_i \sum_{j=1}^{Nr} \sum_{l=1}^{L} |h_{i,j}(l)|.$$

Figure 6:
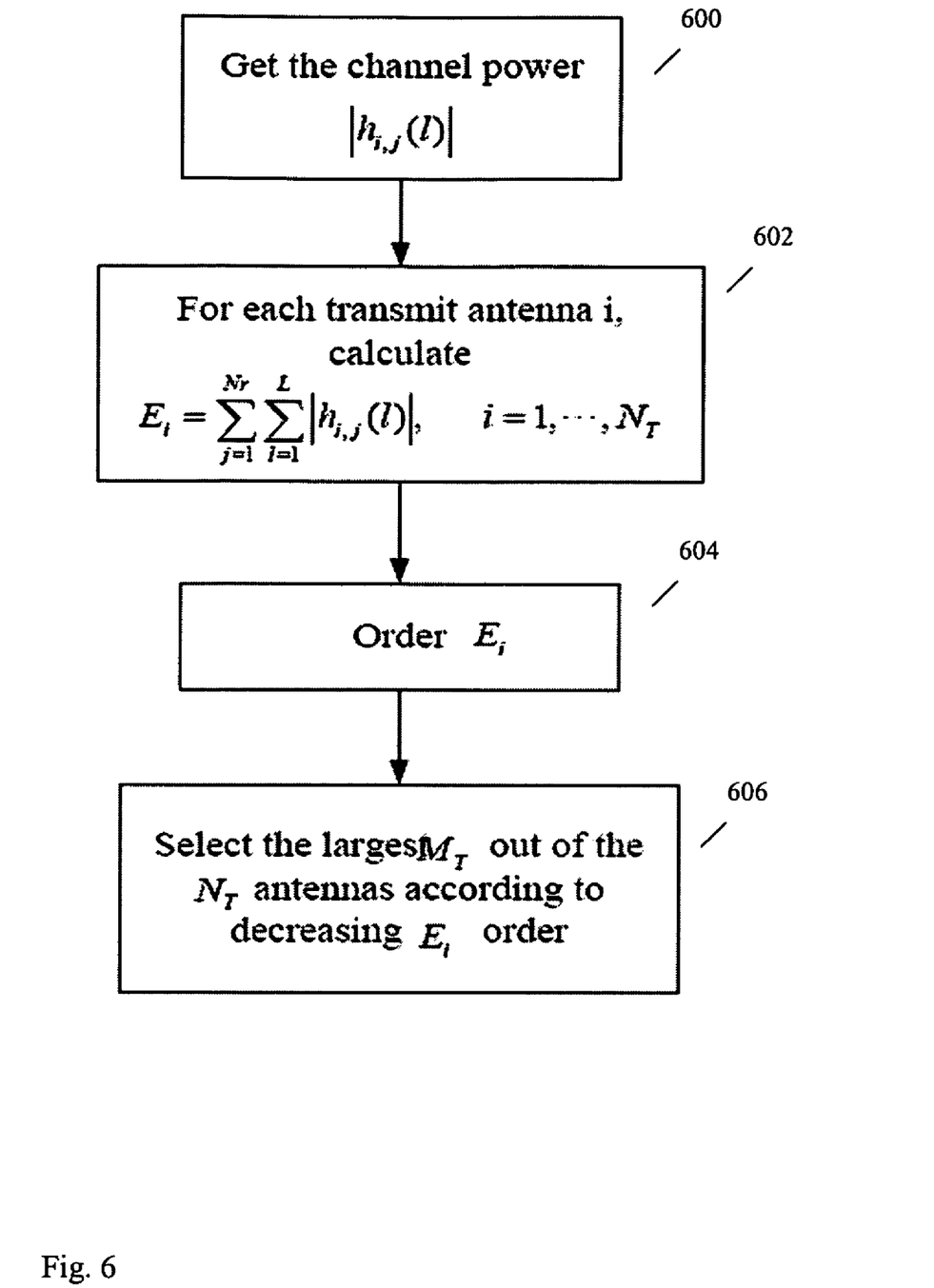
FIG. 6 shows an example antenna selection process based on instantaneous channel knowledge, according to an embodiment of the present invention.

An example selection process based on instantaneous channel knowledge, according to the present invention, is shown in the flowchart of FIG. 6, including the steps of: obtaining channel power (step 600); for each transmit antenna i determining the instantaneous energy $E_i$ of the channel (step 602); ordering the calculated $E_i$ (step 604); and selecting the antenna(s) with the largest $E_i$ (step 606). As such, the antenna(s) with the highest channel energy are selected.

Antenna Selection Based on Statistical Channel Knowledge

In another embodiment, the present invention provides antenna selection method based on statistical channel knowledge, wherein antenna selection is based on the product of diagonal elements of the inverse of correlation matrix determined as:

$$\arg\min_i \prod_{k=1}^{Nt} (R^{-1}_{t,select})_{kk}, \quad \text{for } i=1\ldots N_T,$$

where $R_t$ is the transmitter covariance matrix of the first fading cluster, $R_{t,select}$ is the principle subset of R corresponding to the selected transmit antennas, $N_T$ is the number of transmitter antennas. As such, an antenna is selected that minimizes the product of diagonal elements of the inverse of the correlation matrix.

Figure 7:
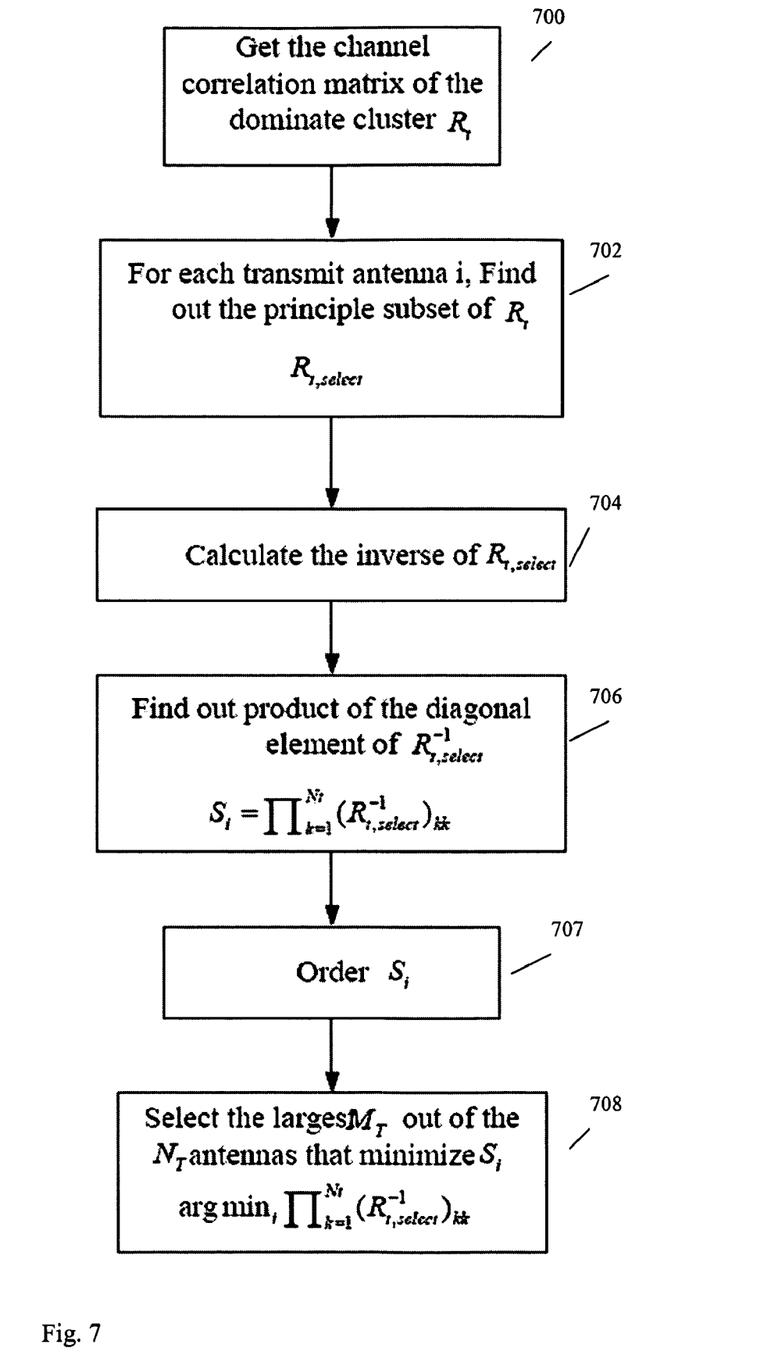
FIG. 7 shows an example antenna selection process based on statistical channel knowledge according to an embodiment of the present invention.

The correlation matrix $R_t$ was described further above, and the inversed correlation matrix is $R_t^{-1}$, following standard matrix inversion definition. Selection based on the product of the diagonal elements is derived by maximizing the average throughput and minimizing the average probability of error. FIG. 7 shows an example flowchart of the steps of such a selection process based on statistical channel knowledge according to an embodiment of the present invention, including the steps of: obtaining the channel correlation matrix of the dominate cluster $R_t$ (step 700); for each transmit antenna i, finding the principle subset $R_{t,select}$ of $R_t$ (step 702); calculating the inverse of $R_{t,select}$ (step 704); in step 706 determining the product of diagonal elements of inverse of $R_{t,select}$ as:

$$S_i = \prod_{k=1}^{Nt} (R^{-1}_{t,select})_{kk};$$

in step 707, order $S_i$;

in step 708, the largest $M_T$ out of the $N_T$ antennas that minimizes $S_i$ is selected as:

$$\arg\min_i \prod_{k=1}^{Nt} (R^{-1}_{t,select})_{kk}, \quad \text{for } i=1\ldots N_T,$$

Antenna Selection Method Based on a Hybrid Knowledge

For highly spatial correlated fading channels, antenna selection based on statistical channel knowledge described above provides better performance. For spatial uncorrelated fading channels, antenna selection based on the instantaneous channel knowledge described above provides better performance.

For wireless local-area network (WLAN) communications, different scenarios have different spatial correlation; wherein according to another embodiment of the present invention antenna selection is based on a hybrid of instantaneous channel knowledge and statistical channel knowledge. This selection method is based on both the instantaneous channel knowledge and its statistical knowledge at the transmitter side. When the spatial correlation is high (e.g., the absolute value of the correlation coefficient is greater than 0.7), the antennas are selected based on the statistical channel knowledge, otherwise, the instantaneous channel state information is used for antenna selection. In one example, the selection switching threshold is set to 0.7 based on simulation results, however the threshold can vary with different MIMO processing algorithms.

Figure 3:
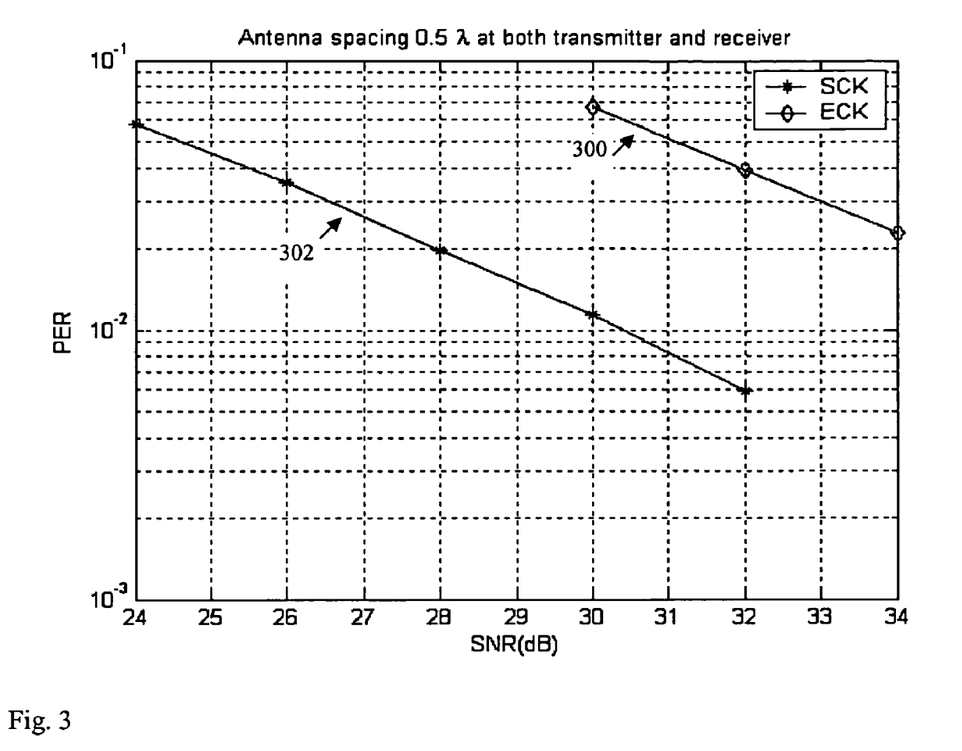
FIG. 3 shows an example comparison of antenna selection with instantaneous channel knowledge (ECK) and statistical knowledge (SCK) with antenna spacing $0.5\lambda$.
Figure 4:
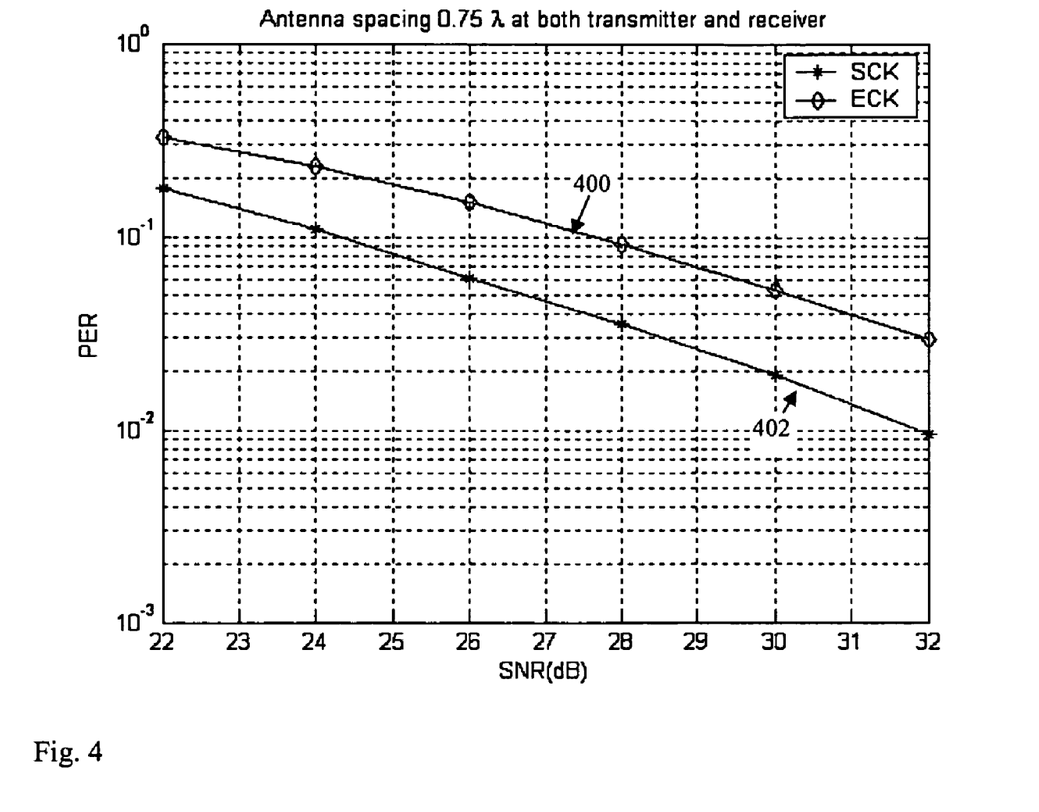
FIG. 4 shows an example comparison of antenna selection with instantaneous channel knowledge (ECK) and statistical knowledge (SCK) with antenna spacing $0.75 \lambda$. SCK is slightly better than ECK.
Figure 5:
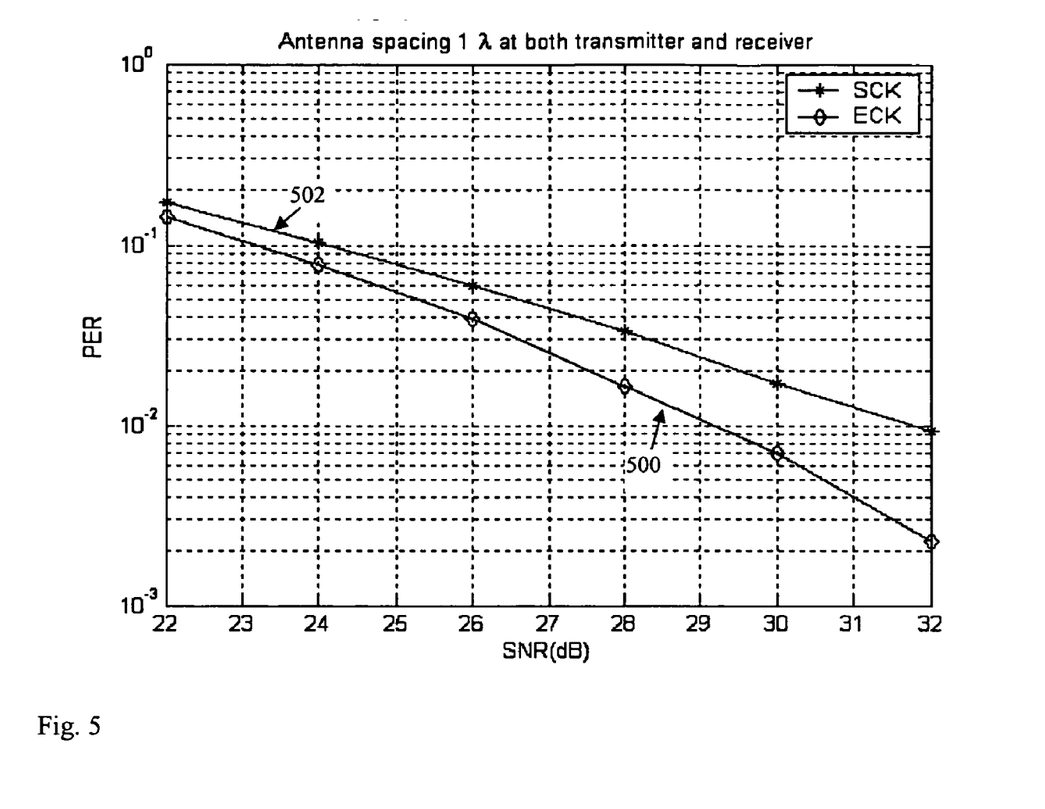
FIG. 5 shows an example comparison of antenna selection with instantaneous channel knowledge (ECK) and statistical knowledge (SCK) with antenna spacing $\lambda$. ECK is better than SCK due to less channel correlation.

FIGS. 3-5 show the simulation results using TGn Sync channel model B with 16 QAM ½ coding. A zero-forcing MIMO detection followed by a hard decision Viterbi decoding with trace back length 36 is used in the simulation. The TGn channel models are described in IEEE 802.11-03/940r1, "TGn Channel Models" by Vinko Erceg et al., November 2003 (incorporated herein by reference).

The transmitter autocorrelation matrix in FIG. 3 with antenna spacing 0.5 λ is:

$$RTx = \begin{bmatrix} 1 & -0.5076+0.7121i & -0.1454-0.6297i & 0.3758+0.2285i \\ -0.5076+0.7121i & 1 & -0.5076+0.7121i & -0.1454-0.6297i \\ -0.1454-0.6297i & -0.5076+0.7121i & 1 & -0.5076+0.7121i \\ 0.3758+0.2285i & -0.1454-0.6297i & -0.5076+0.7121i & 1 \end{bmatrix}$$

The transmitter autocorrelation matrix in FIG. 4 with antenna spacing 0.75 λ is:

$$RTx = \begin{bmatrix} 1 & -0.7486+0.1401i & 0.3758-0.2285i & -0.1501-0.1659i \\ -0.7486+0.1401i & 1 & -0.7486+0.1401i & 0.3758+0.2285i \\ 0.3758-0.2285i & -0.7486+0.1401i & 1 & -0.7486-0.1401i \\ -0.1501+0.1659i & 0.3758-0.2285i & -0.7486+0.1401i & 1 \end{bmatrix}$$

The transmitter autocorrelation matrix in FIG. 5 with antenna spacing 1 λ is:

$$RTx = \begin{bmatrix} 1 & -0.1454-0.6297i & -0.2709+0.0787i & 0.0860+0.0984i \\ -0.1454-0.6297i & 1 & -0.1454-0.6297i & -0.2709+0.0787i \\ -0.2709+0.0787i & -0.1454-0.6297i & 1 & -0.1454-0.6297i \\ 0.0860+0.0984i & -0.2709+0.0787i & -0.1454-0.6297i & 1 \end{bmatrix}$$

FIG. 3 shows example comparison of antenna selection with instantaneous channel knowledge (ECK) 300 and statistical knowledge (SCK) 302 with antenna spacing 0.5 λ, wherein SCK provides slightly better system performance than ECK due to the high channel correlation.

FIG. 4 shows example comparison of antenna selection with instantaneous channel knowledge (ECK) 400 and statistical knowledge (SCK) 402 with antenna spacing 0.75 λ, wherein SCK provides slightly better system performance than ECK.

FIG. 5 shows example comparison of antenna selection with instantaneous channel knowledge (ECK) 500 and statistical knowledge (SCK) 502 with antenna spacing λ, wherein ECK provides better than SCK due to less channel correlation.

The hybrid and ECK antenna selection algorithms are based on full channel state information, wherein such information is obtained from channel sounding (i.e., the transmitter transmits the training sequence to the receiver, the receiver knowing the sequence, estimates the channel state information from the received signal). The antenna selection algorithms herein can be implemented as part of the rate adaptation algorithm at the receiver side. The antenna selection and rate selection are fed back to the transmitter from the receiver.

As such, the present invention provides antenna selection methods for frequency selective fading channels, and further provides tradeoff between the spatial correlation and the instantaneous SNR (e.g., when correlation is high, the antenna(s) are selected based on the statistical information, otherwise, based on the instantaneous SNR).

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of selecting among a plurality of transmit antennas and multiple receive antennas in a MIMO communication system, comprising:
    transmitting a first signal from a first of transmit antennas over a channel;
    measuring a quality metric of the first signal as received at each of the multiple receive antennas; and
    selecting antennas using statistical channel information and instantaneous Signal to Noise Ratio (SNR) of the channel depending on a spatial correlation value, wherein when spatial correlation is greater than a threshold, selecting the antennas based on the statistical channel knowledge, otherwise, utilizing the instant channel state information to select antennas.

2. The method of claim 1 wherein the selecting antennas further includes determining a pair of transmit and receive antennas receiving acceptably a first signal.

3. The method of claim 1 wherein the selecting antennas includes selecting the antennas based on frequency selective channel.

4. The method of claim 1 wherein the selecting antennas includes selecting the antennas based on instant channel state information for each antenna.

5. The method of claim 4 wherein the selecting antennas further includes selecting antennas based on the highest instant channel energy from each transmit antenna.

6. The method of claim 5, wherein the instantaneous energy for each antenna is determined as:

$$\arg\max_i \sum_{j=1}^{Nr} \sum_{l=1}^{L} |h_{i,j}(l)|, \text{ for } i = 1 \ldots N_T,$$

where $N_R$ is the number of receiver antennas, L is the number of transmission paths, $h_{i,j}(l)$ is the channel response from ith transmitter antenna to jth receiver antenna.

7. The method of claim 1 wherein the selecting antennas includes selecting the antennas based on statistical channel information for each antenna.

8. The method of claim 1 wherein the selecting antennas further includes an antenna that minimizes the product of diagonal elements of the inversed correlation matrix.

9. The method of claim 1, wherein selecting antennas using statistical channel information comprises selecting antennas that minimize a product of diagonal elements of the inversed correlation matrix, where the product of diagonal elements of an inversed correlation matrix of the channel is determined as:

$$\arg\min_i \prod_{k=1}^{Nt} (R_{t,select}^{-1})_{kk}, \text{ for } i = 1 \dots N_T,$$

where $R_t$ is the transmitter covariance matrix of the first fading cluster, $R_{t,select}$ is the principle subset of $R_t$ corresponding to the selected transmit antennas, $N_T$ is the number of transmitter antennas.

10. The method of claim 1, wherein when spatial correlation is high, selecting the antennas based on the statistical channel knowledge, otherwise, utilizing the instant channel state information to select antennas.

11. The method of claim 1, wherein the threshold is 0.7.

12. A MIMO communication system, comprising:
a transmitter configured to transmit a first signal from a first of transmit antennas over a channel;
a receiver configured to measure a quality metric of the first signal as received at each of multiple receive antennas; and
a selection module configured to switch between selecting antennas using statistical channel information and an instantaneous Signal to Noise Ratio (SNR) of the channel depending on a spatial correlation value, wherein upon the spatial correlation value being greater than or equal to a predetermined value, using statistical channel information, and upon the spatial correlation value being less than the predetermined value, using instantaneous channel knowledge.

13. The system of claim 12, wherein using the statistical channel information comprises:
selecting antennas that minimize the product of diagonal elements of the inversed correlation matrix, where a product of diagonal elements of an inversed correlation matrix of the channel is determined as:

$$\arg\min_i \prod_{k=1}^{Nt} (R_{t,select}^{-1})_{kk}, \text{ for } i = 1 \dots N_T,$$

where $R_t$ is the transmitter covariance matrix of the first fading cluster, $R_{t,select}$ is the principle subset of $R_t$ corresponding to the selected transmit antennas, $N_T$ is the number of transmitter antennas, and
wherein using the instantaneous Signal to Noise Ratio (SNR) of the channel comprises:
selecting antennas based on the highest instant channel energy from each transmit antenna determined as:

$$\arg\max_i \sum_{j=1}^{Nr} \sum_{l=1}^{L} |h_{i,j}(l)|, \text{ for } i = 1 \dots N_T,$$

where $N_R$ is the number of receiver antennas, L is the number of transmission paths, $h_{i,j}(l)$ is the channel response from ith transmitter antenna to jth receiver antenna.

14. A transmitter in a MIMO communication system, comprising:
a selection module configured to select antennas using statistical channel information and an instantaneous Signal to Noise Ratio (SNR) of the channel depending on a spatial correlation value, wherein when spatial correlation is greater than a threshold selecting the antennas based on the statistical channel knowledge, otherwise, utilizing the instant channel state information to select antennas.

15. The transmitter of claim 14, wherein the transmitter is configured to transmit a first signal from a first of transmit antennas over a channel to a receiver configured to measure a quality metric of the first signal as received at each of the multiple receive antennas.

16. The transmitter of claim 14, wherein selecting antennas based on statistical channel information comprises:
selecting antennas that minimize the product of diagonal elements of the inversed correlation matrix, where a product of diagonal elements of an inversed correlation matrix of the channel is determined as:

$$\arg\min_i \prod_{k=1}^{Nt} (R_{t,select}^{-1})_{kk}, \text{ for } i = 1 \dots N_T,$$

where $R_t$ is the transmitter covariance matrix of the first fading cluster, $R_{t,select}$ is the principle subset of $R_t$ corresponding to the selected transmit antennas, $N_T$ is the number of transmitter antennas.

17. A receiver in a MIMO communication system, comprising:
a selection module configured to select antennas depending on a spatial correlation value, based on the spatial correlation value switching between using statistical channel information and an instantaneous Signal to Noise Ratio (SNR) of the channel, wherein when spatial correlation is greater than a threshold selecting the antennas based on the statistical channel knowledge, otherwise, utilizing the instant channel state information to select antennas, and wherein the receiver is configured to measure a quality metric of a first signal transmitted from a transmitter from a first of transmit antennas over a channel as received at each of multiple receive antennas.

18. The receiver of claim 17, wherein selecting antennas based on instantaneous channel knowledge comprises:
selecting antennas based on the highest instant channel energy from each transmit antenna determined as:

$$\arg\max_i \sum_{j=1}^{Nr} \sum_{l=1}^{L} |h_{i,j}(l)|, \text{ for } i = 1 \dots N_T,$$

where $N_R$ is the number of receiver antennas, L is the number of transmission paths, $h_{i,j}(l)$ is the channel response from ith transmitter antenna to jth receiver antenna.

19. A method of selecting among a plurality of transmit antennas and multiple receive antennas in a MIMO communication system, comprising:

transmitting a first signal from a first of transmit antennas over a channel;

measuring a quality metric of the first signal as received at each of the multiple receive antennas; and selecting antennas based on a spatial correlation value, upon the spatial correlation value being greater than or equal to a predetermined value, using statistical channel information, and upon the spatial correlation value being less than the predetermined value, using instantaneous channel knowledge.

20. The method of claim 19, wherein selecting antennas based on statistical channel information comprises:

selecting antennas that minimize the product of diagonal elements of the inversed correlation matrix, where a product of diagonal elements of an inversed correlation matrix of the channel is determined as:

$$\arg\min_i \prod_{k=1}^{Nt} (R_{t,select}^{-1})_{kk}, \text{ for } i = 1 \ldots N_T,$$

where $R_t$ is the transmitter covariance matrix of the first fading cluster, $R_{t,select}$ is the principle subset of $R_t$ corresponding to the selected transmit antennas, $N_T$ is the number of transmitter antennas, and wherein selecting antennas based on instantaneous channel knowledge comprises:

selecting antennas based on the highest instant channel energy from each transmit antenna determined as:

$$\arg\max_i \sum_{j=1}^{Nr} \sum_{l=1}^{L} |h_{i,j}(l)|, \text{ for } i = 1 \ldots N_T,$$

where $N_R$ is the number of receiver antennas, L is the number of transmission paths, $h_{i,j}(l)$ is the channel response from ith transmitter antenna to jth receiver antenna.

\* \* \* \* \*